(12) United States Patent
Kwon

(10) Patent No.: US 7,662,725 B2
(45) Date of Patent: Feb. 16, 2010

(54) COMPOSITION FOR ETCHING DOUBLE METAL LAYER, METHOD OF FABRICATING ARRAY SUBSTRATE USING THE COMPOSITION, AND METHOD OF FORMING DOUBLE METAL LINE USING THE COMPOSITION

(75) Inventor: Oh-Nam Kwon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 143 days.

(21) Appl. No.: 11/287,220

(22) Filed: Nov. 28, 2005

(65) Prior Publication Data

US 2006/0124206 A1   Jun. 15, 2006

(30) Foreign Application Priority Data

Dec. 10, 2004   (KR) .................... 10-2004-0104387

(51) Int. Cl.
*H01L 21/302*   (2006.01)
*H01L 21/461*   (2006.01)
(52) U.S. Cl. ..................... 438/745; 438/754
(58) Field of Classification Search .............. None
See application file for complete search history.

(56) References Cited

U.S. PATENT DOCUMENTS

| 6,429,908 | B1* | 8/2002 | Lim .......................... 349/54 |
| 2001/0034139 | A1* | 10/2001 | Song et al. ............... 438/745 |
| 2004/0198882 | A1* | 10/2004 | Fujita ...................... 524/261 |
| 2004/0219459 | A1* | 11/2004 | Hirabayash .............. 430/300 |
| 2005/0042530 | A1* | 2/2005 | Kato et al. ................ 430/7 |

FOREIGN PATENT DOCUMENTS

| KR | 10-2000-0021735 A | 4/2000 |
| KR | 10-2002-0014581 A | 2/2002 |

* cited by examiner

*Primary Examiner*—Duy-Vu N Deo
(74) *Attorney, Agent, or Firm*—Morgan Lewis & Bockius LLP

(57) ABSTRACT

A composition for etching a double metal layer, a method of fabricating an array substrate using the composition, and a method of forming a double metal line using the composition are provided. The composition includes about 63.5% to about 64.5% by weight of a phosphoric acid; about 8% to about 9% by weight of a nitric acid; about 8% to about 12% by weight of an acetic acid; and an anionic additive.

13 Claims, 4 Drawing Sheets

COMPOSITION FOR ETCHING DOUBLE METAL LAYER, METHOD OF FABRICATING ARRAY SUBSTRATE USING THE COMPOSITION, AND METHOD OF FORMING DOUBLE METAL LINE USING THE COMPOSITION

This application claims the benefit of Korean Patent Application No. 2004-0104387, filed in Korea on Dec. 10, 2004, which is hereby incorporated by reference.

BACKGROUND OF THE INVENTION

1. Field of the Invention

The present invention relates to a composition for etching a double metal layer, and more particularly, to a composition for etching a double metal layer, a method of fabricating an array substrate, and a method of forming a double metal line for a liquid crystal display device.

2. Discussion of the Related Art

A size of a thin film transistor-liquid crystal display (TFT-LCD) device scales with a length of a metal line transmitting signals in a TFT-LCD device. Accordingly, a resistance of the metal line increases with increased TFT-LCD device size, and the increased resistance causes signal delay. To prevent the signal delay, a metallic material having a relatively low resistance has been suggested for the metal line. For example, aluminum (Al) alloy, molybdenum (Mo), molybdenum (Mo) alloy, copper (Cu), copper (Cu) alloy, silver (Ag) and silver (Ag) alloy have been suggested and researched.

A metal line in a TFT-LCD device is obtained by depositing a metallic material and patterning the deposited metal layer. The patterning step can be performed by a dry etching method or a wet etching method. In general, the metal layer is patterned by a wet etching method. In a wet etching method, a metal layer is patterned using an etching solution referred to as an etchant. The kind of etchant to be used is determined according to a metallic material for the metal layer.

Aluminum (Al) alloy is widely used due to its low resistance. However, aluminum (Al) alloy has a relatively low tolerance to chemicals, such as etchants. Moreover, since aluminum (Al) alloy has a low melting temperature, defects—such as hillocks—are generated in subsequent high temperature processes. Accordingly, a double metal layer including aluminum neodymium (AlNd) and molybdenum (Mo) has been suggested instead of a single metal layer of aluminum (Al) alloy.

A double metal layer of aluminum neodymium (AlNd) and molybdenum (Mo) may be etched using a single etchant to obtain a double metal line of aluminum neodymium (AlNd) and molybdenum (Mo). However, since an etch rate of molybdenum (Mo) is different than an etch rate of aluminum neodymium (AlNd), it is difficult to obtain a double metal line of aluminum neodymium (AlNd) and molybdenum (Mo) having a uniform profile. For example, when a double metal line of molybdenum/aluminum neodymium (Mo/AlNd) is formed from a double metal layer having a molybdenum (Mo) layer formed on an aluminum neodymium (AlNd) layer, the double metal line may have an overhang structure in places where the aluminum neodymium (AlNd) layer does not exist under some portion of the molybdenum (Mo) layer because of over-etching of the aluminum neodymium (AlNd) layer. The overhang structure causes an electrical short or an electrical opening of upper and lower metal lines in a subsequent process. To improve the overhang structure problem, an additional dry etching process is required. In addition, when aluminum neodymium (AlNd) has poor wettability a single etchant, aluminum neodymium (AlNd) residues may be left behind.

When a double metal layer is formed having a structure with an aluminum neodymium (AlNd) layer formed on a molybdenum (Mo) layer, a tail of molybdenum (Mo) remains at a periphery of a double metal line of aluminum neodymium/molybdenum (AlNd/Mo) formed from such a double metal layer because of under-etch of the molybdenum (Mo) layer.

FIG. 1 is a scanning electron microscope (SEM) image showing a double metal line obtained through an etching process according to the related art. While fabrication steps are not shown in FIG. 1, a double metal line of molybdenum/aluminum neodymium (Mo/AlNd) is formed by etching a double metal layer of a lower molybdenum (Mo) and an upper aluminum neodymium (AlNd). After the molybdenum (Mo) layer and the aluminum neodymium (AlNd) layer are sequentially formed on a substrate, a photoresist (PR) pattern is formed on the aluminum neodymium (AlNd) layer. The double metal layer is etched using the PR pattern as an etch mask to form the double metal line, and then the PR pattern is removed. FIG. 1 shows the double metal line after removing the PR pattern. In FIG. 1, the lower molybdenum (Mo) layer remains at a peripheral region "A" of the double metal line to form a molybdenum (Mo) tail. When such a double metal line is used for a display device, the molybdenum (Mo) tail causes a stain in displayed images of the display device.

SUMMARY OF THE INVENTION

Accordingly, the present invention is directed to a composition for etching a double metal layer that substantially obviates one or more of the problems due to limitations and disadvantages of the related art.

An object of the present invention is to provide a composition that etches a double metal layer including aluminum neodymium (AlNd) and molybdenum (Mo) without defects, such as an overhang structure, aluminum neodymium (AlNd) residue, or a molybdenum (Mo) tail.

Another object is to provide a method of forming a double metal line including aluminum neodymium (AlNd) and molybdenum (Mo) using a single composition without defects.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a composition for etching a double metal layer includes: about 63.5% to about 64.5% by weight of a phosphoric acid; about 8% to about 9% by weight of a nitric acid; about 8% to about 12% by weight of an acetic acid; and an anionic additive.

In another aspect of the present invention, a method of fabricating an array substrate for a liquid crystal display device includes: forming a first double metal layer including aluminum neodymium (AlNd) and molybdenum (Mo) on a substrate; forming a first photoresist pattern on the first double metal layer; etching the first double metal layer with a composition including about 63.5% to about 64.5% by weight of a phosphoric acid, about 8% to about 9% by weight of a nitric acid, about 8% to about 12% by weight of an acetic acid, and an anionic additive to form a gate line and a gate electrode; forming a gate insulating layer on the gate line and the gate electrode; forming a semiconductor layer on the gate insulating layer at a portion corresponding to the gate electrode; forming a data line on the gate insulating layer, and source/drain electrodes on the semiconductor layer; forming a passivation layer on the data line and the source and drain electrodes, the passivation layer has a drain contact hole exposing the drain electrode; and forming a pixel electrode on the passivation layer, the pixel electrode connected to the drain electrode through the drain contact hole.

In another aspect, a method of forming a double metal line includes: forming a double metal layer including aluminum neodymium (AlNd) and molybdenum (Mo) on an insulating layer; forming a photoresist pattern on the double metal layer; and etching the double metal layer with a composition including about 63.5% to about 64.5% by weight of a phosphoric acid, about 8% to about 9% by weight of a nitric acid, about 8% to about 12% by weight of an acetic acid, and an anionic additive.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to preferred embodiments of the present invention, examples of which are illustrated in the accompanying drawings. Wherever possible, similar reference numbers will be used throughout the drawings to refer to the same or like parts.

An exemplary composition for etching a double metal layer according to the present invention may be used for forming a double metal line for a display device, such as a liquid crystal display (LCD) device, a plasma display panel (PDP) device, an electroluminescent display (ELD) device, and a field emission display (FED) device. As an example, an LCD device will be illustrated hereinafter.

Figure 1:
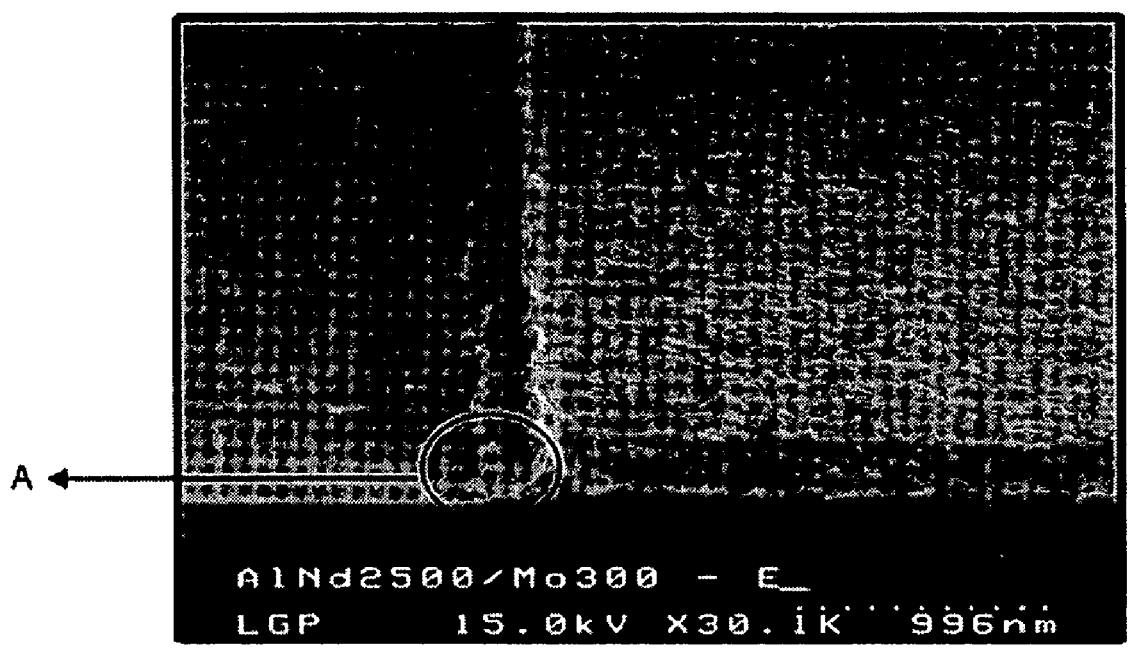
FIG. 1 is a scanning electron microscope (SEM) image showing a double metal line obtained through an etching process according to the related art.
Figure 2:
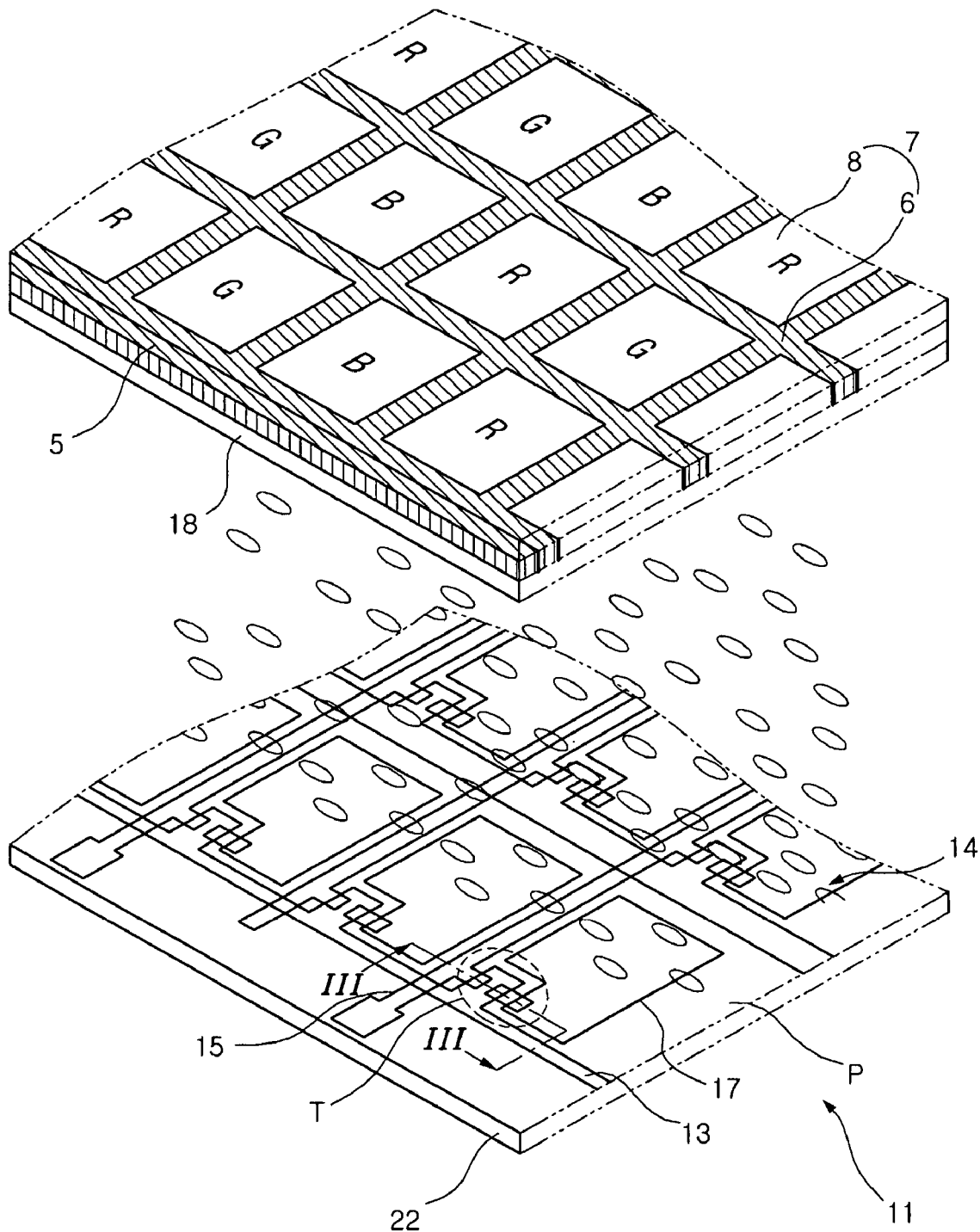
FIG. 2 is a schematic exploded perspective view showing a liquid crystal display device having a double metal line according to an exemplary embodiment of the present invention.

FIG. 2 is a schematic exploded perspective view showing a liquid crystal display device having a double metal line according to the present invention.

In FIG. 2, a liquid crystal display (LCD) device 11 includes a first substrate 22, a second substrate 5 and a liquid crystal layer 14 interposed between the first and second substrates 22 and 5. Gate lines 13 and data lines 15 are formed on the first substrate 22. The gate lines 13 and the data lines 15 cross each other to define pixel regions "P." A pixel electrode 17 and a thin film transistor (TFT) "T" as a switching element are formed on the first substrate 22 in each pixel region "P." Each pixel electrode 17 is formed of a transparent conductive material, such as indium-tin-oxide (ITO) and indium-zinc-oxide (IZO). The TFT "T" is connected to a respective gate line 13 and data line 15. A black matrix 6 is formed on the second substrate 5 and a color filter layer 8 including red, green, and blue sub-color filters is formed on the black matrix 6. A common electrode 18 is formed on the color filter layer 8. Here, at least one of the gate lines 13 and data lines 15 is formed of a double metal layer having aluminum neodymium (AlNd) and molybdenum (Mo).

Figure 3:
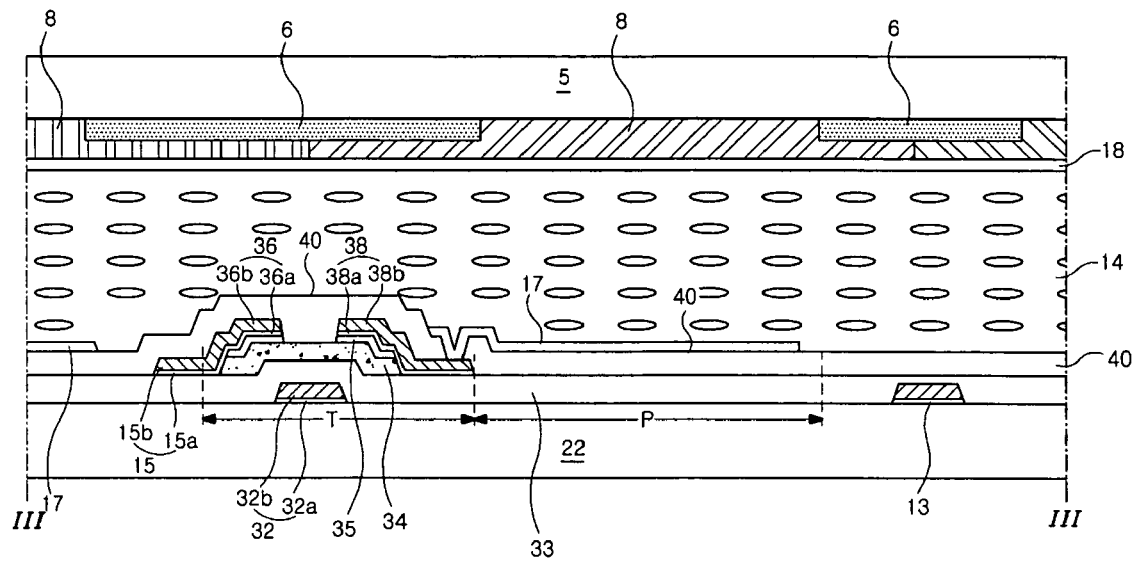
FIG. 3 is a cross-sectional view taken along cross-sectional line III-III of FIG. 2.

FIG. 3 is a cross-sectional view taken along cross-sectional line III-III of FIG. 2. In FIG. 3, a first substrate 22 and a second substrate 5 are spaced apart from each other. A gate line 13 and a gate electrode 32 are formed on the first substrate 22. The gate line 13 is formed of a double metal line having, for example, aluminum neodymium (AlNd) and molybdenum (Mo). The gate line 13 may have a first structure where an aluminum neodymium (AlNd) layer is formed on a molybdenum (Mo) layer or a second structure where a molybdenum (Mo) layer is formed on an aluminum neodymium (AlNd) layer. The gate line 13 has an exemplary first structure where a gate aluminum neodymium (AlNd) line is formed on a gate molybdenum (Mo) line. Similarly, the gate electrode 32 may be formed of a double metal electrode having a gate molybdenum (Mo) electrode 32a and a gate aluminum neodymium (AlNd) electrode 32b on the gate molybdenum (Mo) electrode 32a.

A gate insulating layer 33 is formed on the gate line 13 and the gate electrode 32. A semiconductor layer including an active layer 34 and an ohmic contact layer 35 is formed on the gate insulating layer 33. The active layer 34 is formed on the gate insulating layer 33 corresponding to the gate electrode 32, and the ohmic contact layer 35 is formed on the active layer 34. A data line 15 is formed on the gate insulating layer 33, and source and drain electrodes 36 and 38 are formed on the ohmic contact layer 35. The data line 15 may be formed of a double metal line having aluminum neodymium (AlNd) and molybdenum (Mo). As for the gate line 13, the double metal line may have a first structure where an aluminum neodymium (AlNd) layer is formed on a molybdenum (Mo) layer or a second structure where a molybdenum (Mo) layer is formed on an aluminum neodymium (AlNd) layer. The data line 15 has an exemplary first structure where an aluminum neodymium (AlNd) data line 15b is formed on a molybdenum (Mo) data line 15a. Similarly, the source electrode 36 may be formed of a double metal electrode having a molybdenum (Mo) source electrode 36a and an aluminum neodymium (AlNd) source electrode 36b on the molybdenum (Mo) source electrode 36a, and the drain electrode 38 may be formed of a double metal electrode having a molybdenum (Mo) drain electrode 38a and an aluminum neodymium (AlNd) drain electrode 38b on the molybdenum (Mo) drain electrode 38a. The gate electrode 32, the active layer 34, the source electrode 36, and the drain electrode 38 constitute a thin film transistor (TFT) "T."

A passivation layer 40 is formed on the TFT "T" including the data line 15, the source electrode 36, and the drain electrode 38. A pixel electrode 17 is formed on the passivation layer 40 in the pixel region "P." The passivation layer 40 has a drain contact hole exposing the drain electrode 38, and the pixel electrode 17 is connected to the drain electrode 38 through the drain contact hole. A black matrix 6 corresponding to the gate line 13, the data line 15, and the TFT "T" is formed on the second substrate 5. A color filter layer 8 is formed on the black matrix 6 to correspond to the pixel region "P," and a common electrode 18 is formed on the color filter layer 8. A liquid crystal layer 14 is interposed between the pixel electrode 17 and the common electrode 18.

A composition for etching double metal layer and a method of etching the double metal layer using the composition to form a double metal line for one of the gate lines 13 and the data line 15 of an LCD device will now be described.

In FIG. 3, a molybdenum (Mo) layer and an aluminum neodymium (AlNd) layer are sequentially formed on the first substrate 22 to obtain a double metal layer for the gate line 13. For the data line 15, a molybdenum (Mo) layer and an aluminum neodymium (AlNd) layer are sequentially formed on the gate insulating layer 33. Next, a photoresist (PR) pattern is formed on the aluminum neodymium (AlNd) layer. The aluminum neodymium/molybdenum (AlNd/Mo) double metal layer is etched using the photoresist pattern as an etch mask. A composition including phosphoric acid ($H_3PO_4$), nitric acid ($HNO_3$), acetic acid ($CH_3COOH$), and an anionic additive is used as an etchant for the aluminum neodymium/molybdenum (AlNd/Mo) double metal layer. The aluminum neodymium/molybdenum (AlNd/Mo) double metal layer having the photoresist pattern thereon may be dipped into the composition or the composition may be sprayed onto the aluminum neodymium/molybdenum (AlNd/Mo) double metal layer having the PR pattern thereon under a temperature within a range of about 10° C. to about 80° C.

The exemplary composition for etching the double metal layer according to the present invention may include about 63.5% to about 64.5% by weight, preferably about 64% by weight, of phosphoric acid ($H_3PO_4$). In addition, the exemplary composition for etching the double metal layer according to the present invention may include about 8% to about 9% by weight, preferably about 8.5% by weight, of nitric acid ($HNO_3$). When a content of the nitric acid ($HNO_3$) is less than about 8% by weight, an etch rate is reduced. When a content of the nitric acid ($HNO_3$) is more than about 9% by weight, the photoresist pattern is damaged. Moreover, content of the nitric acid ($HNO_3$) relates to a profile of the obtained double metal line. For example, when a content of the nitric acid ($HNO_3$) is exceedingly low, the obtained double metal layer has a poor uniformity in profile.

The exemplary composition for etching the double metal layer according to the present invention may include about 8% to about 12% by weight, preferably about 10% by weight, of acetic acid ($CH_3COOH$). When a content of the acetic acid ($CH_3COOH$) is less than about 8% by weight, the acetic acid ($CH_3COOH$) does not function as a buffer of the composition. When a content of the acetic acid ($CH_3COOH$) is more than about 12% by weight, the photoresist pattern is damaged.

The exemplary composition for etching the double metal layer according to the present invention may include about 1% to about 4% by weight, preferably 3% by weight, of anionic additive. The anionic additive reduces a potential difference between molybdenum (Mo) and aluminum neodymium (AlNd) to prevent galvanic or electro-chemical corrosion. The anionic additive may include a fluoric anionic surfactant. In addition, the surfactant improves wettability of the composition.

Figure 4:
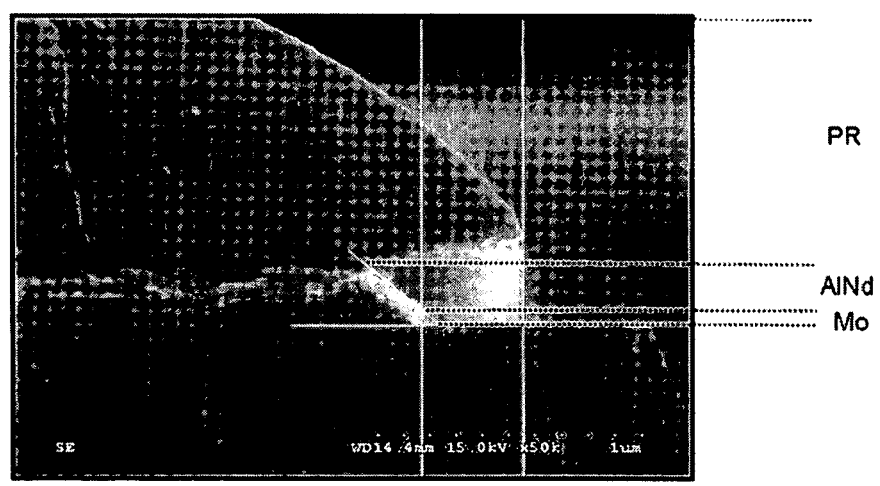
FIG. 4 is a cross-sectional scanning electron microscope (SEM) image showing a double metal line obtained using a composition for etching a double metal layer according to an exemplary embodiment of the present invention.
Figure 5:
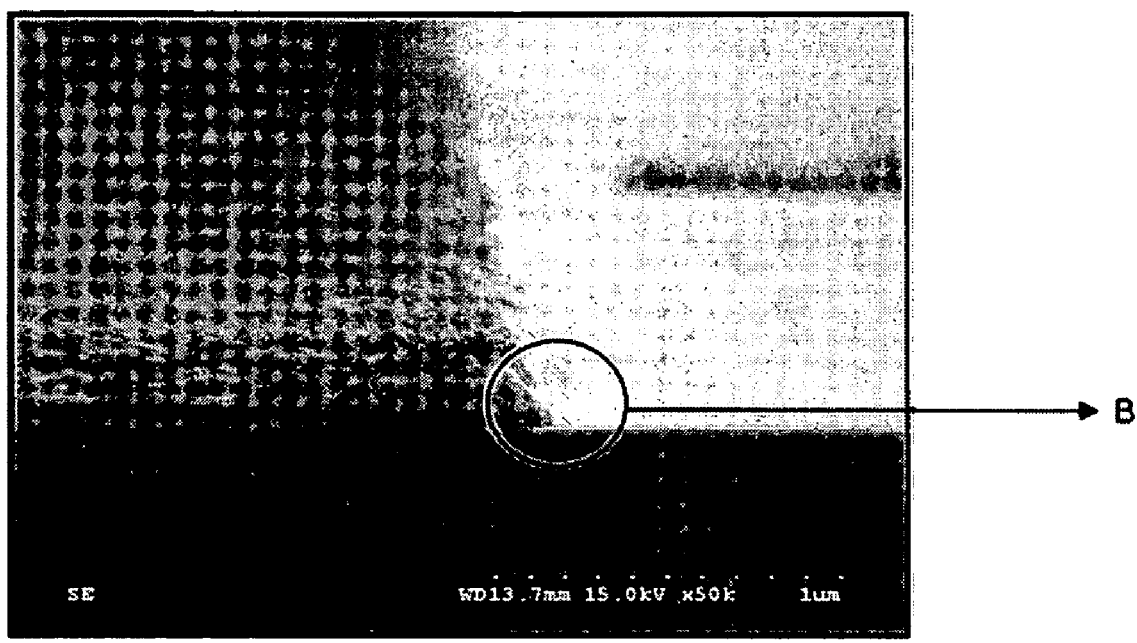
FIG. 5 is a perspective scanning electron microscope (SEM) image showing a double metal line obtained using a composition for etching a double metal layer according to an exemplary embodiment of the present invention.

The double metal layer of molybdenum (Mo) and aluminum neodymium (AlNd) is etched using the composition according to the present invention to obtain a double metal line having an excellent profile and an excellent uniformity. FIGS. 4 and 5 are cross-sectional and perspective scanning electron microscope (SEM) images, respectively, showing a double metal line obtained using a composition for etching a double metal layer according to an exemplary embodiment of the present invention. A double metal line has an aluminum neodymium/molybdenum (AlNd/Mo) structure where a molybdenum (Mo) line is formed on a substrate and an aluminum neodymium (AlNd) line is formed on the molybdenum (Mo) line. A double metal layer including an aluminum neodymium (AlNd) and molybdenum (Mo) having a photoresist pattern thereon is etched using a composition including about 64% by weight of phosphoric acid ($H_3PO_4$); about 8.5% by weight of nitric acid ($HNO_3$); about 10% by weight of an acetic acid ($CH_3COOH$); and about 3% by weight of an additive.

As shown in FIG. 4, the double metal line of molybdenum (Mo) and aluminum neodymium (AlNd) has an excellent cross-sectional profile. The thickness of the double metal line is about 0.25 μm, and the edge slope of the double metal line has an angle of about 42° with respect to the substrate. In FIG. 5, the photoresist pattern on the double metal line is removed. Unlike a metal line obtained through the related art etching process, the upper aluminum neodymium (AlNd) layer and the lower molybdenum (Mo) layer are clearly patterned. As a result, molybdenum (Mo) tails do not exist at a peripheral region "B" of the metal line. In addition, no aluminum neodymium (AlNd) residues are observed on the substrate except for the double metal line.

Consequently, a double metal line is obtained without aluminum neodymium (AlNd) residues using a composition for etching a double metal layer according to the present invention. In addition, a double metal line is obtained without an overhang structure using a composition according to the present invention. Moreover, a double metal line is obtained without a molybdenum (Mo) tail using a composition according to the present invention. As a result, a display device having a double metal line obtained using a composition according to the present invention has several advantages. First, size and resolution of the display device are improved due to a relatively low resistance of the double metal line. Second, electrical shorts and electrical openings of metal lines in the display device are prevented due to elimination of the overhang structure. Third, stain is prevented in displayed images of the display device due to elimination of the molybdenum (Mo) tail.

It will be apparent to those skilled in the art that various modifications and variations can be made in the composition for etching a double metal layer, the method of fabricating an array substrate using the composition, and a method of forming a double metal line using the same according to the present invention without departing from the spirit or scope of the invention. Thus, it is intended that the present invention cover the modifications and variations of this invention provided they come within the scope of the appended claims and their equivalents.

What is claimed is:

1. A method of fabricating an array substrate for a liquid crystal display device, comprising:

forming a first double metal layer including aluminum neodymium (AlNd) and molybdenum (Mo) on a substrate;

forming a first photoresist pattern on the first double metal layer;

etching the first double metal layer with a composition including about 63.5% to about 64.5% by weight of a phosphoric acid, about 8% to about 9% by weight of a nitric acid, about 8% to about 12% by weight of an acetic acid, and about 1% to about 4% by weight of a fluoric anionic surfactant to form a gate line and a gate electrode without an AlNd residue and a Mo tail;

forming a gate insulating layer on the gate line and the gate electrode;

forming a semiconductor layer on the gate insulating layer at a portion corresponding to the gate electrode;

forming a data line on the gate insulating layer and source/drain electrodes on the semiconductor layer;

forming a passivation layer on the data line and the source and drain electrodes, the passivation layer has a drain contact hole exposing the drain electrode; and forming a pixel electrode on the passivation layer, the pixel electrode connected to the drain electrode through the drain contact hole.

2. The method according to claim 1, wherein the phosphoric acid has a content of about 64% by weight.

3. The method according to claim 1, wherein the nitric acid has a content of about 8.5% by weight.

4. The method according to claim 1, wherein the acetic acid has a content of about 10% by weight.

5. The method according to claim 1, wherein the first double metal layer includes a lower molybdenum (Mo) layer and an upper aluminum neodymium (AlNd) layer.

6. The method according to claim 1, wherein the first double metal layer includes a lower aluminum neodymium (AlNd) layer and an upper molybdenum (Mo) layer.

7. The method according to claim 1, wherein forming the data line and the source/drain electrodes, comprises:

forming a second double metal layer including aluminum neodymium (AlNd) and molybdenum (Mo) on the gate insulating layer;

forming a second photoresist pattern on the second double metal layer; and etching the second double metal layer with the composition.

8. The method according to claim 1, wherein the uniform edge slope has an angle of about 42° with respect to the substrate.

9. A method of forming a double metal line, comprising:

forming a double metal layer including aluminum neodymium (AlNd) and molybdenum (Mo) on an insulating layer;

forming a photoresist pattern on the double metal layer; and etching the double metal layer with a composition including about 63.5% to about 64.5% by weight of a phosphoric acid, about 8% to about 9% by weight of a nitric acid, about 8% to about 12% by weight of an acetic acid, and about 1% to about 4% by weight of a fluoric anionic surfactant to form the double metal line without an AlNd residue and a Mo tail.

10. The method according to claim 9, wherein the phosphoric acid has a content of about 64% by weight.

11. The method according to claim 9, wherein the nitric acid has a content of about 8.5% by weight.

12. The method according to claim 9, wherein the acetic acid has a content of about 10% by weight.

13. The method according to claim 9, wherein the fluoric anionic surfactant has a content of about 3% by weight.

* * * * *